United States Patent

[11] 3,556,552

| [72] | Inventor | Franz Deckert<br>Sindelfingen, Germany |
|---|---|---|
| [21] | Appl. No. | 771,837 |
| [22] | Filed | Oct. 30, 1968 |
| [45] | Patented | Jan. 19, 1971 |
| [73] | Assignee | Daimler-Benz Aktiengesellschaft<br>Stuttgart-Unterturkheim, Germany |
| [32] | Priority | Oct. 31, 1967 |
| [33] | | Germany |
| [31] | | No. 1,630,380 |

[54] VEHICLE BODY WITH BOX-SHAPED HOLLOW BEARER
10 Claims, 4 Drawing Figs.

[52] U.S. Cl................................................ 280/106,
52/731; 248/14; 280/87
[51] Int. Cl........................................................ B62d 25/00

[50] Field of Search........................................... 280/87, 93,
96, 106; 296/28; 52/731, 732; 248/14, 16;
74/(Inquired)

[56] References Cited
FOREIGN PATENTS
1,003,137  9/1965  Great Britain................ 296/28

*Primary Examiner*—Benjamin Hersh
*Assistant Examiner*—Leslie J. Paperner
*Attorney*—Craig & Antonelli ABSTRACT: A vehicle body which includes a box-shaped hollow bearer on which a unit such as a steering gear is secured by means of bolts or the like extending through the hollow bearer; a box-shaped support body which is provided within the area of the securing places, substantially lines the hollow bearer; the support body, in its turn, is reinforced within the area of the fastening bolts which extend through the same.

INVENTOR

FRANZ DECKERT

BY Craig & Antonelli

ATTORNEYS

INVENTOR
FRANZ DECKERT

BY Craig & Antonelli

ATTORNEYS

VEHICLE BODY WITH BOX-SHAPED HOLLOW BEARER

The present invention relates to a vehicle body having a box-shaped hollow bearer at which an aggregate, for example, a steering gear is secured by means of a threaded connection extending through the hollow bearer.

For the purpose of securing aggregates or units at hollow bearers of vehicle bodies by means of threaded connections, one has heretofore reinforced the hollow bearer within the area of the securing bolts by welded-in tubular or pipe sections. However, this type of fastening does not satisfy all requirements and demands if it is exposed to very high loads and especially to alternating stresses as is the case, for example, with the fastening of a steering gear. Stresses occur at the welded places, cracks form and after a certain time, the pipe sections tear off. The threaded connection becomes loose, and a proper functioning of the steering is impaired with a steering gear that no longer is securely fastened.

The present invention aims at so constructing the securing places that failures and harmful consequences resulting therefrom cannot occur. The underlying problems are solved in accordance with the present invention in that a box-shaped support body lining the hollow bearer is provided within the area of the securing places of the unit, which is reinforced within the area of the securing bolts extending through the same.

By the arrangement of the box-shaped support body in the hollow bearer which is preferably held fast by spot welding, the entire cross section of the hollow bearer is effectively utilized for the loads and stresses by a clamping action by means of the securing bolts. Welded places at the hollow bearer within the area of the bores for the securing bolts which could lead to stresses in the material and to cracks, are completely eliminated.

According to a further feature of the present invention, the support body may be open on one side at which it does not abut against the hollow bearer. A favorable access to the support body is advantageously established thereby which may be of use during the fastening of the support body in the hollow bearer, for example, by spot welding.

The reinforcement in the support body may consist of welded-in, pipe or tubular sections.

In a vehicle body in which a unit is secured at the hollow body by means of three securing bolts, of which two bolts are seated within the area of the inserted support body, an additional support body of pot-shaped construction may be arranged in the hollow body within the area of the third securing bolt. This arrangement is particularly recommended in connection with mounting of steering gears in which the third securing point is intended to absorb tilting moments that may occur.

Accordingly, it is an object of the present invention to provide a vehicle body with a box-shaped hollow bearer that eliminates by simple means the aforementioned shortcomings and drawbacks encountered in the prior art.

Another object of the present invention resides in a vehicle body with a box-shaped hollow bearer that fully satisfies all load requirements.

A further object of the present invention resides in a box-shaped hollow bearer of the type described above which eliminates the danger of failure as well as obviates the need for welded seams within the area of the bores for the securing bolts.

Another object of the present invention resides in a box-shaped hollow bearer of the type described above, particularly for the support of the steering gear which is not only able to absorb all forces including tilting moments but additionally minimizes the danger of failures, in particular at the welded places.

These and further objects, features and advantages of the present invention will become more obvious from the following description when taken in connection with the accompanying drawing which shows, for purposes of illustration only, one embodiment in accordance with the present invention and wherein.

Figure 1:
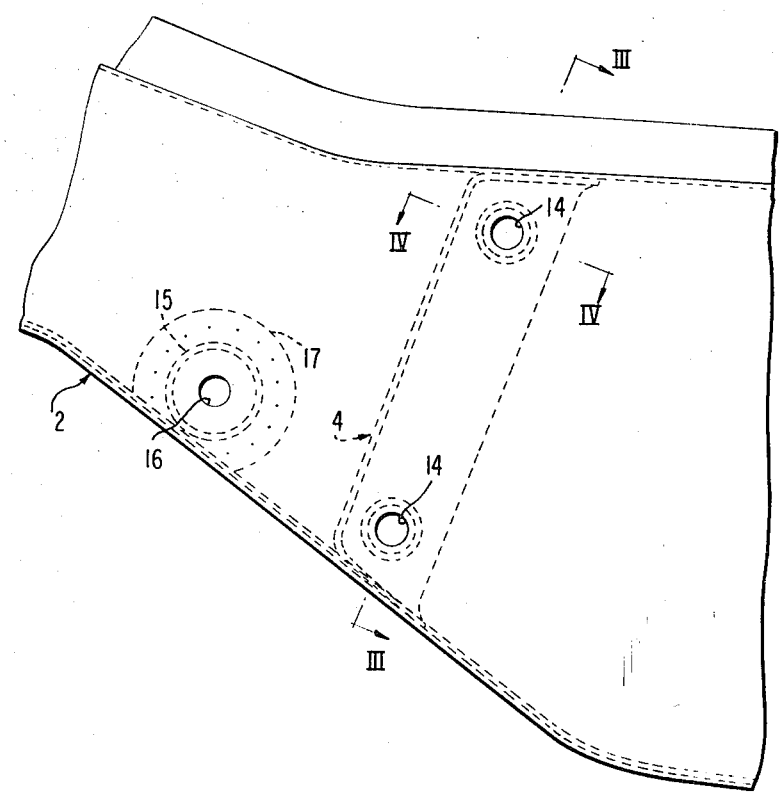
FIG. 1 is a partial side elevational side view of a box-shaped hollow longitudinal bearer of a vehicle body within the area of the securing place of a steering gear.
Figure 2:
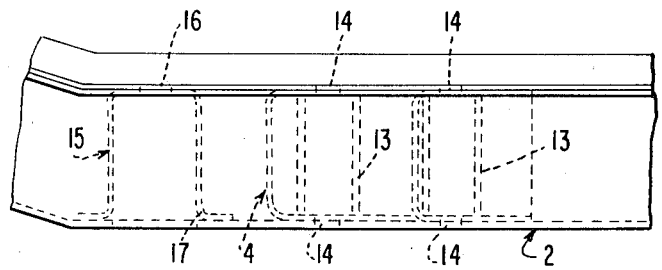
FIG. 2 is a top plan view on the longitudinal bearer of FIG. 1.
Figure 3:
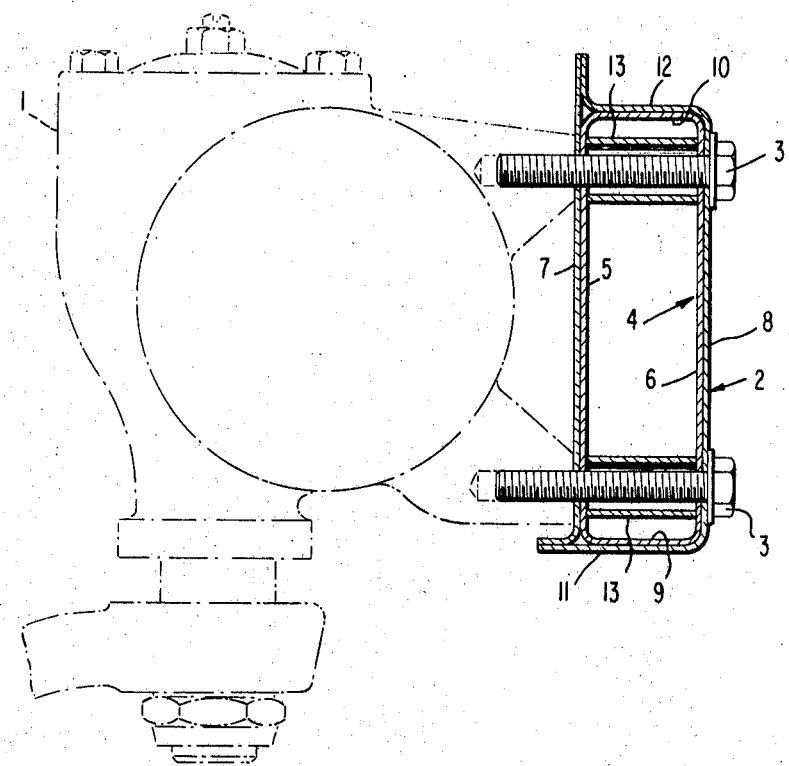
FIG. 3 is a cross-sectional view through the longitudinal bearer taken along line III–III of FIG. 1.
Figure 4:
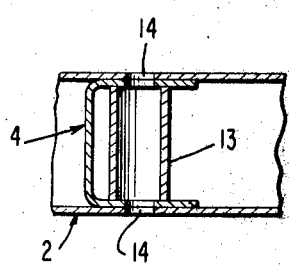
FIG. 4 is a cross-sectional view through the longitudinal bearer taken along line IV–IV of FIG. 1.

Referring now to the drawing wherein like reference numerals are used throughout the various views to designate like parts, and more particularly to FIG. 3, the steering gear 1 indicated in this FIG. in dash and dot lines is secured at the illustrated box-shaped hollow longitudinal bearer generally designated by reference numeral 2 of a vehicle body by means of three fastening bolts 3 which extend through the longitudinal bearer 2. For purposes of reinforcing the securing places within the area of two of these fastening bolts 3 which have to absorb principally the occurring forces, the box-shaped support body generally designated by reference numeral 4 is arranged within the longitudinal bearer 2. The walls 5 and 6 of the support body 4 abut against the walls 7 and 8 of the longitudinal bearer 2 and the walls 9 and 10 of the former abut against the walls 11 and 12 of the latter. The support body 4 is open on one side so that the tubular or pipe sections 13 can be welded into the same. The center longitudinal axes of the pipe sections 13 are disposed coaxially to the center longitudinal axes of bores 14 through the walls 5, 6, 7 and 8 for the securing bolts 3. The support body 4 reinforces the longitudinal bearer 2 whereas the pipe sections 13 reinforce the support body 4. With a bolted-on steering gear 1, the entire cross section of the longitudinal bearer is utilized for the load by the clamping action by means of the bolts 3.

The third securing or fastening point is provided for the purpose of absorbing tilting moments which act on the steering gear 1. Within the area of this third fastening point, the longitudinal bearer 2 is reinforced by the pot-shaped support body generally designated by reference numeral 15 which is arranged within the longitudinal bearer 2. The bore 16 for the securing bolt extends through the bottom of the support body 15 and through the wall 7 of the longitudinal bearer 2. The flanged rim 17 of the support body 15 is welded to the wall 8 of the longitudinal bearer 2. The large diameter of the support body 15 provides a sufficient counterpressure surface during tightening of the securing bolt.

While I have shown and described only one embodiment in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are within the scope of those skilled in the art.

I claim:

1. A vehicle body with a box-shaped hollow bearer at which a unit is adapted to be secured by a threaded connection extending through the hollow bearer, characterized by box-shaped support body means substantially lining the hollow bearer and provided within the area of at least some of the securing places of the unit, and reinforcing means for reinforcing said support body means within the area of the threaded connections extending through the same.

2. A vehicle body according to claim 1, in which the unit is secured at the hollow bearer by means of three fastening bolts of which two are located within the area of the inserted support body means, and additional support body means, and additional support body means of substantially pot-shaped construction arranged within the area of the third fastening bolt.

3. A vehicle body according to claim 1, wherein the threaded connection includes threaded bolt means.

4. A vehicle body according to claim 1, wherein said support body means is open on one side, on which it fails to abut against the hollow bearer.

5. A vehicle body according to claim 4, wherein the reinforcing means in the support body means includes tubular sections spot welded on one side thereof during assembly into the same.

6. A vehicle body according to claim 1, wherein said unit is a steering gear.

7. A vehicle body according to claim 6, wherein the threaded connection includes threaded bolt means.

8. A vehicle body according to claim 7, wherein said support body means is open on one side, on which it fails to abut against the hollow bearer.

9. A vehicle body according to claim 8, wherein the reinforcing means in the support body means includes tubular sections spot welded on one side thereof during assembly into the same.

10. A vehicle body according to claim 9, in which the unit is secured at the hollow bearer by means of three fastening bolts of which two are located within the area of the inserted support body means, and additional support body means of substantially pot-shaped construction arranged within the area of the third fastening bolt.